US011075670B2

(12) United States Patent
Zhang et al.

(10) Patent No.: US 11,075,670 B2
(45) Date of Patent: Jul. 27, 2021

(54) METHOD AND DEVICE FOR FREQUENCY HOPPING SYNCHRONIZATION, RECEIVER AND TRANSMITTER

(71) Applicant: HARXON CORPORATION, Guangdong (CN)

(72) Inventors: Haijun Zhang, Guangdong (CN); Juanjuan Xu, Guangdong (CN); Shiwei Wu, Guangdong (CN); Jie Zhang, Guangdong (CN)

(73) Assignee: HARXON CORPORATION, Guangdong (CN)

( * ) Notice: Subject to any disclaimer, the term of this patent is extended or adjusted under 35 U.S.C. 154(b) by 0 days.

(21) Appl. No.: 16/641,253

(22) PCT Filed: Oct. 11, 2017

(86) PCT No.: PCT/CN2017/105616
§ 371 (c)(1),
(2) Date: Feb. 24, 2020

(87) PCT Pub. No.: WO2019/037207
PCT Pub. Date: Feb. 28, 2019

(65) Prior Publication Data
US 2020/0235777 A1 Jul. 23, 2020

(30) Foreign Application Priority Data
Aug. 22, 2017 (CN) .......................... 201710725092.3

(51) Int. Cl.
*H04B 1/7156* (2011.01)
*H04B 1/715* (2011.01)

(52) U.S. Cl.
CPC ........... *H04B 1/7156* (2013.01); *H04B 1/715* (2013.01)

(58) Field of Classification Search
None
See application file for complete search history.

(56) References Cited

U.S. PATENT DOCUMENTS

| 4,601,043 A | * | 7/1986 | Hardt | ...................... H04B 1/713 |
| | | | | 375/134 |
| 4,677,617 A | * | 6/1987 | O'Connor | ............ H04B 1/7156 |
| | | | | 370/478 |

(Continued)

FOREIGN PATENT DOCUMENTS

| CA | 3014595 A1 | * 12/2018 | .......... H04W 56/004 |
| CA | 3073693 A1 | * 2/2019 | ........... H04B 1/7156 |

(Continued)

OTHER PUBLICATIONS

"International Search Report (Form PCT/ISA/210) of PCT/CN2017/105616," dated May 10, 2018, with English translation thereof, pp. 1-6.

*Primary Examiner* — Berhanu Tadese
(74) *Attorney, Agent, or Firm* — JCIP Global Inc.

(57) ABSTRACT

The present disclosure provides a method and device for frequency hopping synchronization, a receiver, and a transmitter. The method comprises: when a synchronous frame, which is sent by the transmitter and comprises a transmitter frequency hopping starting count value corresponding to a preset clock, is received, determining a first count value, corresponding to the preset clock, of the received synchronous frame; acquiring the transmitter frequency hopping starting count value, corresponding to the preset clock, in the synchronous frame and the number of relevant transmission bytes of the synchronous frame; based on the received first count value and the received number of relevant transmission bytes of the synchronous frame, determining a predicted transmitter frequency hopping count value corresponding to the preset clock; and based on the predicted (Continued)

when a synchronous frame, which is sent by a transmitter and comprises a transmitter frequency hopping starting count value corresponding to a preset clock, is received, determining a first count value, corresponding to the preset clock, of the received synchronous frame — S101 acquiring the transmitter frequency hopping starting count value, corresponding to the preset clock, in the synchronous frame and the number of relevant transmission bytes of the synchronous frame — S102 based on the received first count value and the received number of relevant transmission bytes of the synchronous frame, determining a predicted transmitter frequency hopping count value corresponding to the preset clock — S103 based on the predicted transmitter frequency hopping count value and the transmitter frequency hopping starting count value, determining a receiver frequency hopping starting count value — S104 transmitter frequency hopping count value and the transmitter frequency hopping starting count value, determining a receiver frequency hopping starting count value. By applying the present technical solution, the frequency hopping of the receiver can be synchronized with the frequency hopping of the transmitter according to the receiver frequency hopping starting count value, and the precision of frequency hopping synchronization is greatly improved as the frequency hopping synchronization is implemented by controlling the receiver frequency hopping starting count value.

7 Claims, 4 Drawing Sheets

(56) References Cited

U.S. PATENT DOCUMENTS

| | | | | | |
|---|---|---|---|---|---|
| 4,807,248 | A * | 2/1989 | Pyatt | | H04B 1/713 375/366 |
| 4,850,036 | A * | 7/1989 | Smith | | H04B 1/7156 455/502 |
| 5,079,768 | A * | 1/1992 | Flammer | | H04B 1/7156 340/2.1 |
| 5,130,987 | A * | 7/1992 | Flammer | | H04B 1/713 370/436 |
| 5,282,207 | A * | 1/1994 | Jurkevich | | H04J 3/1682 370/468 |
| 5,712,867 | A * | 1/1998 | Yokev | | G01S 1/026 340/7.21 |
| 5,717,688 | A * | 2/1998 | Belanger | | H04B 1/7143 370/331 |
| 5,729,680 | A * | 3/1998 | Belanger | | H04B 1/713 709/222 |
| 5,838,730 | A * | 11/1998 | Cripps | | H04B 1/7143 375/272 |
| 5,995,571 | A * | 11/1999 | Inuzuka | | H04B 1/70754 375/149 |
| 6,031,829 | A * | 2/2000 | Dupuy | | H04B 7/2621 370/337 |
| 6,052,406 | A * | 4/2000 | Epstein | | H04B 1/7156 375/130 |
| 6,061,389 | A * | 5/2000 | Ishifuji | | H04B 1/713 375/133 |
| 6,119,176 | A * | 9/2000 | Maruyama | | G06F 13/28 370/232 |
| 7,715,793 | B2 * | 5/2010 | Fuccello | | H04W 76/10 455/41.2 |
| 8,358,613 | B1 * | 1/2013 | Giallorenzi | | H04W 12/033 370/328 |
| 9,270,329 | B2 * | 2/2016 | Sellier | | H04B 1/7143 |
| 10,326,518 | B1 * | 6/2019 | Magley | | H04B 7/15528 |
| 2001/0000693 | A1 * | 5/2001 | Hamamoto | | G11C 8/18 365/230.08 |
| 2002/0155808 | A1 * | 10/2002 | Kawamura | | G08C 17/00 455/3.05 |
| 2002/0159434 | A1 * | 10/2002 | Gosior | | H04L 1/1685 370/350 |
| 2003/0003867 | A1 * | 1/2003 | Kawamura | | G08C 17/02 455/41.1 |
| 2003/0188028 | A1 * | 10/2003 | Kawamura | | H04W 28/06 709/249 |
| 2004/0028083 | A1 * | 2/2004 | Billhartz | | H04B 1/7156 370/503 |
| 2004/0057499 | A1 * | 3/2004 | Haartsen | | H04L 25/03866 375/136 |
| 2004/0073321 | A1 * | 4/2004 | Kondo | | H04N 7/0125 700/28 |
| 2004/0125239 | A1 * | 7/2004 | Rahn | | H03J 5/0227 348/731 |
| 2005/0094640 | A1 * | 5/2005 | Howe | | H04L 63/20 370/395.1 |
| 2006/0215779 | A1 * | 9/2006 | Shiina | | H04L 27/2665 375/260 |
| 2007/0103805 | A1 * | 5/2007 | Hayashi | | G11B 20/10222 360/39 |
| 2007/0162623 | A1 * | 7/2007 | Kondo | | H04N 21/4135 710/2 |
| 2007/0172000 | A1 * | 7/2007 | Hamamoto | | H04L 27/34 375/324 |
| 2008/0068217 | A1 * | 3/2008 | Van Wyk | | H04W 8/005 340/870.11 |
| 2008/0107157 | A1 | 5/2008 | De Ruijter | | |
| 2008/0310377 | A1 * | 12/2008 | Flammer | | H04W 40/24 370/338 |
| 2009/0135887 | A1 * | 5/2009 | Andersson | | H04B 1/7156 375/134 |
| 2009/0296684 | A1 * | 12/2009 | Ye | | H04J 3/0608 370/350 |
| 2009/0316758 | A1 * | 12/2009 | Ahn | | H04B 1/7143 375/135 |
| 2010/0075611 | A1 * | 3/2010 | Budampati | | H04L 27/10 455/67.11 |
| 2010/0203835 | A1 * | 8/2010 | Ryu | | H04W 56/0015 455/41.2 |
| 2012/0224607 | A1 * | 9/2012 | Sun | | H04W 84/08 375/133 |
| 2013/0279365 | A1 * | 10/2013 | Hui | | H04L 45/04 370/253 |
| 2014/0029603 | A1 * | 1/2014 | Nomura | | H04W 56/0015 370/350 |
| 2014/0269722 | A1 * | 9/2014 | Uchida | | H04L 45/7453 370/392 |
| 2015/0071329 | A1 * | 3/2015 | Dewasurendra | | H04B 1/7156 375/134 |
| 2015/0215177 | A1 * | 7/2015 | Pietrowicz | | H04W 24/10 370/230 |
| 2015/0222325 | A1 * | 8/2015 | Sellier | | H04Q 9/00 375/133 |
| 2016/0157078 | A1 * | 6/2016 | Palin | | H04W 8/005 455/41.2 |
| 2016/0262193 | A1 * | 9/2016 | Hariharan | | H04W 4/80 |
| 2017/0060297 | A1 * | 3/2017 | Gradinariu | | G06F 3/044 |
| 2018/0003799 | A1 * | 1/2018 | Yang | | G01S 13/93 |
| 2018/0006681 | A1 * | 1/2018 | Bi | | H04B 1/715 |
| 2019/0075489 | A1 * | 3/2019 | Chung | | H04W 72/0446 |
| 2019/0173597 | A1 * | 6/2019 | Zhang | | H04J 3/0644 |
| 2019/0246221 | A1 * | 8/2019 | Shariati | | H04L 1/00 |
| 2020/0044844 | A1 * | 2/2020 | Sridhara | | H04W 12/108 |
| 2020/0059784 | A1 * | 2/2020 | Batra | | H04W 12/041 |
| 2020/0067633 | A1 * | 2/2020 | Carsello | | H04B 7/26 |
| 2020/0120033 | A1 * | 4/2020 | Wolberg | | H04B 1/715 |
| 2020/0137699 | A1 * | 4/2020 | Girardier | | H04W 56/001 |
| 2020/0195300 | A1 * | 6/2020 | Zhang | | H04B 1/02 |
| 2020/0235777 | A1 * | 7/2020 | Zhang | | H04B 1/715 |
| 2020/0267131 | A1 * | 8/2020 | Tal | | H04W 12/0433 |
| 2020/0267540 | A1 * | 8/2020 | Tal | | H04L 9/0869 |
| 2020/0267547 | A1 * | 8/2020 | Tal | | H04W 12/047 |
| 2020/0295869 | A1 * | 9/2020 | Carsello | | H04L 1/0038 |

FOREIGN PATENT DOCUMENTS

| | | | |
|---|---|---|---|
| CN | 1719781 | 1/2006 | |
| CN | 101753201 | 6/2010 | |
| CN | 101771439 A * | 7/2010 | H04B 1/7156 |
| CN | 102412954 | 4/2012 | |
| CN | 103068030 | 4/2013 | |
| CN | 103532590 | 1/2014 | |
| CN | 105356962 A * | 2/2016 | H04W 56/00 |
| CN | 106230539 A * | 12/2016 | H04W 56/00 |
| CN | 106332267 | 1/2017 | |
| CN | 107040327 | 8/2017 | |
| CN | 107040327 A * | 8/2017 | H04J 3/0655 |
| CN | 107070498 | 8/2017 | |
| CN | 107453770 A * | 12/2017 | H04B 1/713 |
| CN | 107517069 A * | 12/2017 | H04B 1/715 |
| CN | 105356962 B * | 5/2018 | H04W 56/00 |
| EP | 3444975 A1 * | 2/2019 | H04W 56/0005 |
| EP | 3444975 A4 * | 3/2020 | H04W 56/004 |

(56) References Cited

FOREIGN PATENT DOCUMENTS

| WO | 2016092166 | 6/2016 | | |
| WO | WO-2018227830 A1 | * 12/2018 | ............ | H04J 3/0655 |
| WO | WO-2019037207 A1 | * 2/2019 | ........... | H04B 1/7156 |

* cited by examiner

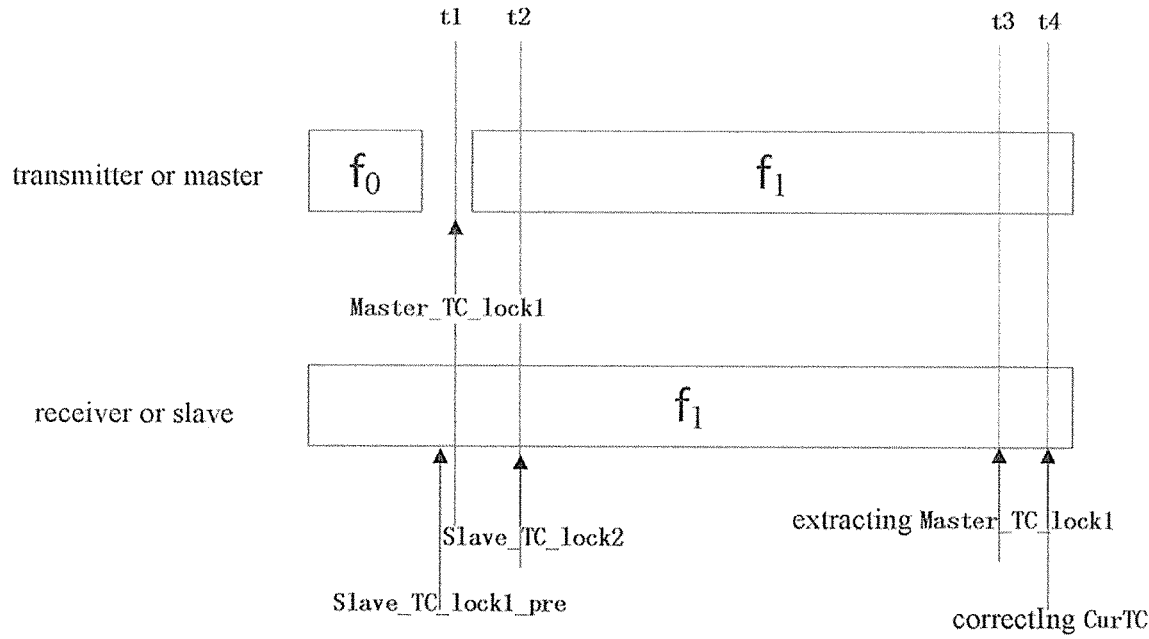

FIG. 3

```
determining a difference value between the predicted transmitter frequency
hopping count value and the transmitter frequency hopping starting count value,
and taking the difference value between the predicted transmitter frequency      ⌒ S401
hopping count value and the transmitter frequency hopping starting count value
            as a count correction value of frequency hopping
```

```
determining a difference value between a current count value corresponding to
the preset clock and the count correction value of frequency hopping, and taking
the difference value between the current count value corresponding to the preset  ⌒ S204
clock and the count correction value of frequency hopping as the receiver
              frequency hopping starting count value
```

FIG. 4

METHOD AND DEVICE FOR FREQUENCY HOPPING SYNCHRONIZATION, RECEIVER AND TRANSMITTER

CROSS-REFERENCE TO RELATED APPLICATION

This application is a 371 of international application of PCT application serial no. PCT/CN2017/105616, filed on Oct. 11, 2017, which claims the priority benefit of China application no. 201710725092.3, filed on Aug. 22, 2017. The entirety of each of the above mentioned patent applications is hereby incorporated by reference herein and made a part of this specification.

TECHNICAL FIELD

The present disclosure relates to the field of radio communication, in particular to a method for frequency hopping synchronization, a device for frequency hopping synchronization, a receiver and a transmitter.

BACKGROUND

With the development of communication technology, anti-interception and anti-interference communication methods are used to prevent the contents of communication from being intercepted and interfered during transmission, and frequency hopping technology is just one of them.

Frequency hopping technology is a method of transmitting signals by changing the carrier frequency discretely according a predetermined rule, and in order to enable a receiving terminal to obtain effective signals sent by a sending terminal using the frequency hopping technology, hopping frequencies output by the receiving terminal must be strictly synchronized with frequencies generated by a frequency hoper at the sending terminal; however, due to clock drift, time differences caused by indefinite distance between the receiving terminal and the transmitting end, and oscillator frequency drift, the frequency hopping of the receiving terminal may be not synchronized with the frequency hopping of the transmitting terminal. Therefore, how to synchronize the frequency hopping of the receiving terminal with the frequency hopping of the transmitting terminal is the key to solve the above problems.

SUMMARY

In order to overcome or at least partially solve the above technical problems, the following technical solutions are provided:

A first embodiment of the present disclosure provides a method for frequency hopping synchronization, comprising the following steps:

when a synchronous frame, which is sent by a transmitter and comprises a transmitter frequency hopping starting count value corresponding to a preset clock, is received, determining a first count value, corresponding to the preset clock, of the received synchronous frame;

acquiring the transmitter frequency hopping starting count value, corresponding to the preset clock, in the synchronous frame and the number of relevant transmission bytes of the synchronous frame;

based on the received first count value and the received number of relevant transmission bytes of the synchronous frame, determining a predicted transmitter frequency hopping count value corresponding to the preset clock; and based on the predicted transmitter frequency hopping count value and the transmitter frequency hopping starting count value, determining a receiver frequency hopping starting count value.

Alternatively, the number of relevant transmission bytes comprises: the number of transmission bytes of a synchronization information payload in the synchronous frame, the preset number of transmission bytes of a preamble in the synchronous frame and the preset number of transmission bytes of a synchronization word in the synchronous frame.

Alternatively, the step of based on the received first count value and the received number of relevant transmission bytes of the synchronous frame, determining the predicted transmitter frequency hopping count value corresponding to the preset clock, comprises:

determining a second count value, corresponding to the preset clock, corresponding to the number of relevant transmission bytes of the synchronous frame; and determining a difference value between the received first count value and the second count value, and taking the difference value as the predicted transmitter frequency hopping count value.

Alternatively, the step of based on the predicted transmitter frequency hopping count value and the transmitter frequency hopping starting count value, determining the receiver frequency hopping starting count value, comprises:

determining a difference value between the predicted transmitter frequency hopping count value and the transmitter frequency hopping starting count value, and taking the difference value between the predicted transmitter frequency hopping count value and the transmitter frequency hopping starting count value as a count correction value of frequency hopping; and determining a difference value between a current count value corresponding to the preset clock and the count correction value of frequency hopping, and taking the difference value between the current count value corresponding to the preset clock and the count correction value of frequency hopping as the receiver frequency hopping starting count value.

Alternatively, the receiver frequency hopping starting count value is determined by the following formulae:

$$CurTC_{corrected} = CurTC_{uncorrected} - delta\_TC$$

wherein $CurTC_{corrected}$ is the receiver frequency hopping starting count value, $CurTC_{uncorrected}$ is the current count value corresponding to the preset clock, and $delta\_TC$ is the count correction value of frequency hopping $$delta\_TC = Slave\_TC\_lock11\_pre - Master\_TC\_lock1$$

wherein $Slave\_TC\_lock11\_pre$ is the predicted transmitter frequency hopping count value; and $Master\_TC\_lock1$ is the transmitter frequency hopping starting count value; and $$Slave\_TC\_lock11\_pre = Slave\_TC\_lock2 - (Nbyte1 + Nbyte2 + Nbyte3) * Cnt\_per\_Byte$$

wherein $Slave\_TC\_lock2$ is the first count value, $Nbyte1$ is the preset number of bytes of the preamble, $Nbyte2$ is the preset number of bytes of the synchronization word, and $Nbyte3$ is the number of bytes of the synchronization information payload received at the time of the first count value; and $Cnt\_per\_Byte$ is a count value, corresponding to the preset clock corresponding to each byte in $Nbyte1$, $Nbyte2$ and $Nbyte3$.

Alternatively, the method further comprises the step of:

repeating the steps of when a synchronous frame comprises a transmitter frequency hopping starting count value corresponding to a preset clock, is received, determining a first count value, corresponding to the preset clock, of the received synchronous frame;

acquiring the transmitter frequency hopping starting count value, corresponding to the preset clock, in the synchronous frame and the number of relevant transmission bytes of the synchronous frame;

based on the received first count value and the received number of relevant transmission bytes of the synchronous frame, determining a predicted transmitter frequency hopping count value corresponding to the preset clock; and based on the predicted transmitter frequency hopping count value and the transmitter frequency hopping starting count value, determining a receiver frequency hopping starting count value; to maintain frequency hopping synchronization.

A second embodiment of the present disclosure provides a device for frequency hopping synchronization, comprising:

a first determining module, configured to, when a synchronous frame, which is sent by a transmitter and comprises a transmitter frequency hopping starting count value corresponding to a preset clock, is received, determine a first count value, corresponding to the preset clock, of the received synchronous frame;

an acquiring module, configured to acquire the transmitter frequency hopping starting count value, corresponding to the preset clock, in the synchronous frame and the number of relevant transmission bytes of the synchronous frame;

a second determining module, configured to, based on the received first count value and the received number of relevant transmission bytes of the synchronous frame, determine a predicted transmitter frequency hopping count value corresponding to the preset clock; and a third determining module, configured to, based on the predicted transmitter frequency hopping count value and the transmitter frequency hopping starting count value, determine a receiver frequency hopping starting count value.

Alternatively, the number of relevant transmission bytes comprises: the number of transmission bytes of a synchronization information payload in the synchronous frame, the preset number of transmission bytes of a preamble in the synchronous frame and the preset number of transmission bytes of a synchronization word in the synchronous frame.

Alternatively, the second determining module comprises: a second count value determining unit, configured to determine a second count value, corresponding to the preset clock corresponding to the number of relevant transmission bytes of the synchronous frame; and a predicted transmitter frequency hopping count value determining unit, configured to determine a difference value between the received first count value and the second count value, and take the difference value as the predicted transmitter frequency hopping count value.

Alternatively, the third determining module comprises:

a correction value determining unit, configured to determine a difference value between the predicted transmitter frequency hopping count value and the transmitter frequency hopping starting count value, and take the difference value between the predicted transmitter frequency hopping count value and the transmitter frequency hopping starting count value as a count correction value of frequency hopping; and a frequency hopping time information determining unit, configured to determine a difference value between a current count value corresponding to the preset clock and the count correction value of frequency hopping, and take the difference value between the current count value corresponding to the preset clock and the count correction value of frequency hopping as the receiver frequency hopping starting count value.

Alternatively, the receiver frequency hopping starting count value is determined by the following formulae:

$$CurTC_{corrected} = CurTC_{uncorrected} - delta\_TC$$

wherein $CurTC_{corrected}$ is the receiver frequency hopping starting count value, $CurTC_{uncorrected}$ is the current count value corresponding to the preset clock, and delta_TC is the count correction value of frequency hopping;

$$delta\_TC = Slave\_TC\_lock11\_pre - Master\_TC\_lock1$$

wherein Slave_TC_lock11_pre is the predicted transmitter frequency hopping count value; and Master_TC_lock1 is the transmitter frequency hopping starting count value; and $$Slave\_TC\_lock11\_pre = Slave\_TC\_lock2 - (Nbyte1 + Nbyte2 + Nbyte3) * Cnt\_per\_Byte$$

wherein Slave_TC_lock2 is the first count value, Nbyte1 is the preset number of bytes of the preamble, Nbyte2 is the preset number of bytes of the synchronization word, and Nbyte3 is the number of bytes of the synchronization information payload received at the time of the first count value; and Cnt_per_Byte is a count value corresponding to the preset clock, corresponding to each byte in Nbyte1, Nbyte2 and Nbyte3.

Alternatively, the device further comprises: a repeat module, configured to repeat the steps of when a synchronous frame comprises a transmitter frequency hopping starting count value corresponding to a preset clock, is received, determining a first count value, corresponding to the preset clock, of the received synchronous frame;

acquiring the transmitter frequency hopping starting count value, corresponding to the preset clock, in the synchronous frame and the number of relevant transmission bytes of the synchronous frame;

based on the received first count value and the received number of relevant transmission bytes of the synchronous frame, determining a predicted transmitter frequency hopping count value corresponding to the preset clock; and based on the predicted transmitter frequency hopping count value and the transmitter frequency hopping starting count value, determining a receiver frequency hopping starting count value; to maintain frequency hopping synchronization.

A third embodiment of the present disclosure provides a receiver comprising the device for frequency hopping synchronization of any one of the technical solutions described above.

A fourth embodiment of the present disclosure provides a method for frequency hopping synchronization, comprising the following steps:

latching a count value corresponding to a preset clock;

adding the latched count value corresponding to the preset clock into a preset synchronous frame; and sending the synchronous frame at a next preset time of the count value.

A fifth embodiment of the present disclosure provides a device for frequency hopping synchronization, comprising:

a latching module, configured to latch a count value corresponding to a preset clock;

an adding module, configured to add the latched count value corresponding to the preset clock into a preset synchronous frame; and a sending module, configured to send the synchronous frame at a next preset time of the count value.

A sixth embodiment of the invention provides a transmitter comprising a device for frequency hopping synchronization; and the device comprises:

a latching module, configured to latch a count value corresponding to a preset clock;

an adding module, configured to add the latched count value corresponding to the preset clock into a preset synchronous frame; and a sending module, configured to send the synchronous frame at a next preset time of the count value.

According to the technical solutions of the present disclosure, when a synchronous frame, which is sent by a transmitter and comprises a transmitter frequency hopping starting count value corresponding to a preset clock, is received, a first count value, corresponding to the preset clock, of the received synchronous frame is determined; the transmitter frequency hopping starting count value, corresponding to the preset clock, in the synchronous frame and the number of relevant transmission bytes of the synchronous frame are acquired; based on the received first count value and the received number of relevant transmission bytes of the synchronous frame, a predicted transmitter frequency hopping count value corresponding to the preset clock is determined; and based on the predicted transmitter frequency hopping count value and the transmitter frequency hopping starting count value, a receiver frequency hopping starting count value is determined; therefore, the frequency hopping of a receiver can be synchronized with the frequency hopping of the transmitter according to the receiver frequency hopping starting count value, and the precision of frequency hopping synchronization is greatly improved as the frequency hopping synchronization is implemented by controlling the receiver frequency hopping starting count value; besides, the time for frequency hopping synchronization can be shortened and the probability of success of frequency hopping synchronization can also be increased while the precision of frequency hopping synchronization is greatly improved, so that the stability of the frequency hopping system is enhanced.

Additional aspects and advantages of the present disclosure will be set forth in part in the following description, and will become apparent from the following description, or can be learned by practice of the present disclosure.

BRIEF DESCRIPTION OF THE DRAWINGS

The foregoing and/or additional aspects and advantages of the present disclosure will be apparent and better understood from the following description of the embodiments with reference to the accompanying drawings, in which:

FIG. 3 is a schematic diagram of a determination process of frequency hopping synchronization according to the first embodiment of the present disclosure;

FIG. 4 is a flowchart of the step of determining a receiver frequency hopping starting count value according to the first embodiment of the present disclosure;

DETAILED DESCRIPTION OF THE PRESENT DISCLOSURE

Figure 1:
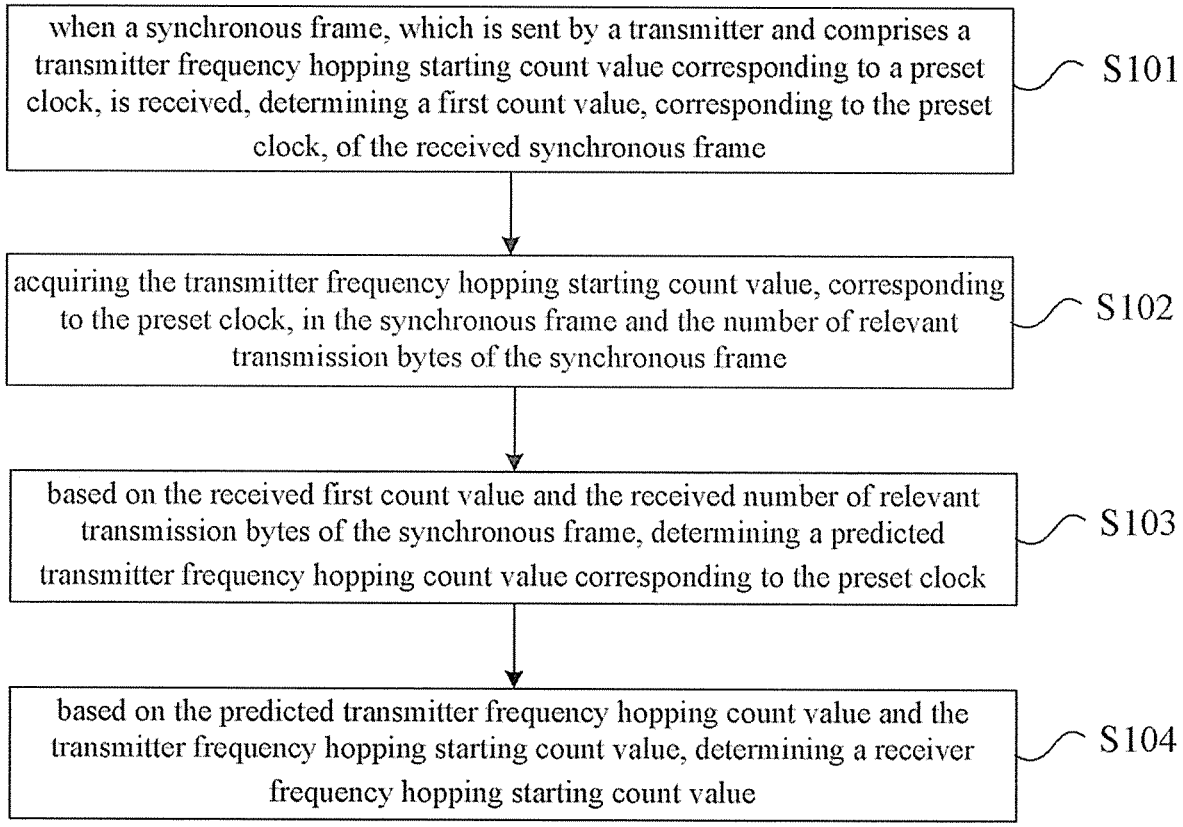
FIG. 1 is a flowchart of a method for frequency hopping synchronization according to the first embodiment of the present disclosure.

The embodiments of the present disclosure will be explained in detail below, examples of which are illustrated in the accompanying drawings, in which like or similar reference numerals refer to the same or similar elements or elements having the same or similar functions throughout. The embodiments described below by reference to the drawings are illustrative only and are not to be construed as limiting the invention.

It will be appreciated by those skilled in the art that, the singular forms "a", "an", "said" and "the" as used herein may include the plural forms as well, unless expressly stated otherwise. It should be further appreciated that, the term "comprises/comprising" as used herein is taken to specify the presence of stated features, integers, steps, operations, elements, and/or components, but does not preclude the presence or addition of one or more other features, integers, steps, operations, elements, components, and/or groups thereof. It should be appreciated that, when an element is referred to as being "connected" or "coupled" to another element, it may be directly connected or coupled to the another element or intervening elements may also be present. Furthermore, the term "connected" or "coupled" as used herein may include wirelessly connected or wirelessly coupled. As used herein, the term "and/or" includes all or any element and all combinations of one or more of the associated listed items.

It will be appreciated by those skilled in the art that, unless otherwise defined, all terms (including technical and scientific terms) used herein have the same meaning as commonly understood by one of ordinary skill in the art of the present disclosure. It should also be appreciated that terms, such as those defined in commonly used dictionaries, should be interpreted as having a meaning that is consistent with the meaning in the context of the prior art and will not be interpreted in an idealized or overly formal sense unless expressly so defined herein.

FIG. 1 is a flowchart of a method for frequency hopping synchronization according to the first embodiment of the present disclosure.

It should be noted that, the executive subject of this embodiment is a receiver or slave.

Step S101: when a synchronous frame, which is sent by a transmitter and comprises a transmitter frequency hopping starting count value corresponding to a preset clock, is received, a first count value, corresponding to the preset clock, of the received synchronous frame is determined; Step S102: the transmitter frequency hopping starting count value, corresponding to the preset clock, in the synchronous frame and the number of relevant transmission bytes of the synchronous frame are acquired; Step S103: based on the received first count value and the received number of relevant transmission bytes of the synchronous frame, a predicted transmitter frequency hopping count value corresponding to the preset clock is determined; and Step S104:

based on the predicted transmitter frequency hopping count value and the transmitter frequency hopping starting count value, a receiver frequency hopping starting count value is determined.

According to the technical solutions of the present disclosure, when a synchronous frame, which is sent by a transmitter and comprises a transmitter frequency hopping starting count value corresponding to a preset clock, is received, a first count value, corresponding to the preset clock, of the received synchronous frame is determined; the transmitter frequency hopping starting count value, corresponding to the preset clock, in the synchronous frame and the number of relevant transmission bytes of the synchronous frame are acquired; based on the received first count value and the received number of relevant transmission bytes of the synchronous frame, a predicted transmitter frequency hopping count value corresponding to the preset clock is determined; and based on the predicted transmitter frequency hopping count value and the transmitter frequency hopping starting count value, a receiver frequency hopping starting count value is determined; therefore, the frequency hopping of a receiver can be synchronized with the frequency hopping of the transmitter according to the receiver frequency hopping starting count value, and the precision of frequency hopping synchronization is greatly improved as the frequency hopping synchronization is implemented by controlling the receiver frequency hopping starting count value; besides, the time for frequency hopping synchronization can be shortened and the probability of success of frequency hopping synchronization can also be increased while the precision of frequency hopping synchronization is greatly improved, so that the stability of the frequency hopping system is enhanced.

The optional implementation of each step is further described below:

Step S101: when the synchronous frame, which is sent by the transmitter and comprises the transmitter frequency hopping starting count value corresponding to a preset clock, is received, the first count value, corresponding to the preset clock, of the received synchronous frame is determined.

Figure 2:
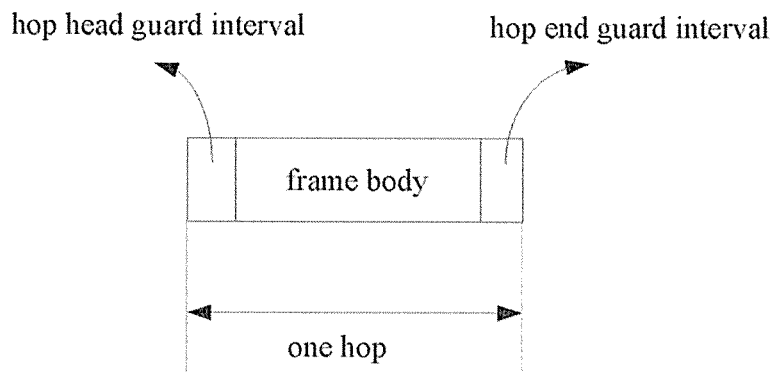
FIG. 2 is a schematic diagram of a synchronous frame according to the first embodiment of the present disclosure.

In this embodiment, the synchronous frame, as shown in FIG. 2, is composed of a preamble, a synchronization word and a synchronization information payload, the synchronization information payload carries precise timing information of the transmitter or master, i.e., the transmitter frequency hopping starting count value corresponding to the preset clock, which is a precise clock count value determined by a precise clock counter, and guard intervals with a preset length are added to the frame head and the frame end of the synchronous frame, wherein the guard interval added to the frame head is a hop head guard interval which is filled with the preamble; and the guard interval added to the frame end is a hop end guard interval which is used for reserving a certain period of time and does not transmit data.

Optionally, in the frequency hopping system, when the frequency hopping of the receiver or slave is not synchronized with the frequency hopping of the transmitter or master, the receiver or slave performs slow scanning to receive data by using each hopping frequency in a plurality of preset hopping frequencies in turn, and as shown in FIG. 3, the frequency value of the receiver at a time just after t1 matches the frequency value of the transmitter, so that the receiver can start to receive data sent by the transmitter, and when the receiver receives the synchronous frame data sent by the transmitter for the first time, i.e., at a time t2, a current precise clock count value of the receiver, i.e., the first count value Slave_TC_lock2 corresponding to the preset clock, is latched.

It should be noted that, in this embodiment, a synchronous frame for frequency hopping synchronization is defined in the frequency hopping system, and the transmitter sends the synchronous frame by using an interval of frequency hopping of 4 ms, a precise clock counter with a frequency of 1 M and a precision of 1 us, and an over-the-air baud rate of 115200 Bd, wherein the transmitter performs fast scanning to send the synchronous frame by using 4 preset hopping frequencies with an interval of frequency hopping of 4 ms, and the receiver not in synchronization performs slow scanning to receive the synchronous frame by using the same 4 hopping frequencies as the transmitter with an interval of frequency hopping of 20 ms; and the guard intervals with the preset length added to the frame head and the frame end of the synchronous frame are used for reserving a certain time interval between two adjacent hopping frequencies to eliminate errors caused by frequency switching, processing delay, propagation delay and crystal oscillator deviation.

Step S102: the transmitter frequency hopping starting count value, corresponding to the preset clock, in the synchronous frame and the number of relevant transmission bytes of the synchronous frame are acquired.

In this embodiment, the number of relevant transmission bytes comprises: the number of transmission bytes of the synchronization information payload in the synchronous frame, the preset number of transmission bytes of the preamble in the synchronous frame and the preset number of transmission bytes of the synchronization word in the synchronous frame.

Optionally, the transmitter latches a current precise clock count value of the transmitter at a previous time before signal sending, i.e., the transmitter hopping starting count value Master_TC_lock1 corresponding to the preset clock, which is determined by the precise clock counter, that is, at a starting time of frequency hopping of the transmitter, the transmitter stores the precise clock count value in the synchronization information payload in the synchronous frame and transmits the synchronous frame; when the receiver receives the synchronous frame sent by the transmitter for the first time during slow scanning, the current precise clock count value Slave_TC_lock2 of the receiver is latched, as shown in FIG. 3, when the time moves to a time t3, the receiver parses the synchronization information payload in the received synchronous frame to extract the precise clock count value Master_TC_lock1 sent by the transmitter, and the number of bytes of the synchronization information payload parsed at the current time is latched as Nbyte 3; meanwhile, the number of bytes of the preamble in the synchronous frame sent by the transmitter is a preset constant Nbyte1, and the number of bytes of the synchronization word in the synchronous frame sent by the transmitter is a preset constant Nbyte2.

It should be noted that, the precise clock counter is set to zero at the time of the end of each frequency hopping, and the count value of the precise clock counter can be modified; and the preset constant Nbyte1 and the preset constant Nbyte2 are given data and may be obtained from a preset storage area of the receiver directly.

Step S103: based on the received first count value and the received number of relevant transmission bytes of the synchronous frame, the predicted transmitter frequency hopping count value corresponding to the preset clock is determined.

Optionally, the step of based on the received first count value and the received number of relevant transmission bytes of the synchronous frame, the predicted transmitter frequency hopping count value corresponding to the preset clock is determined, comprises: a second count value, corresponding to the preset clock, corresponding to the number of relevant transmission bytes of the synchronous frame is determined; and a difference value between the received first count value and the second count value is determined, and the difference value is taken as the predicted transmitter frequency hopping count value.

For example, the receiver calculates the predicted transmitter frequency hopping count value Slave_TC_lock11_pre by the following formula (1):

$$Slave\_TC\_lock11\_pre=Slave\_TC\_lock2-(Nbyte1+Nbyte2+Nbyte3)*Cnt\_per\_Byte \quad (1)$$

wherein Slave_TC_lock2 is the first count value, Nbyte1 is the preset number of bytes of the preamble, Nbyte2 is the preset number of bytes of the synchronization word, and Nbyte3 is the number of bytes of the synchronization information payload received at the time of the first count value; Cnt_per_Byte is a count value, of the precise clock counter corresponding to each byte in Nbyte1, Nbyte2 and Nbyte31; and Nbyte1 and Nbyte2 are preset constants which have been given and can be obtained from a preset storage area of the receiver directly.

Step S104: based on the predicted transmitter frequency hopping count value and the transmitter frequency hopping starting count value, the receiver frequency hopping starting count value is determined.

Optionally, the step of based on the predicted transmitter frequency hopping count value and the transmitter frequency hopping starting count value, the receiver frequency hopping starting count value is determined, as shown in FIG. 4, comprises: S401: a difference value between the predicted transmitter frequency hopping count value and the transmitter frequency hopping starting count value is determined, and the difference value between the predicted transmitter frequency hopping count value and the transmitter frequency hopping starting count value is taken as a count correction value of frequency hopping; and S402: a difference value between a current count value corresponding to the preset clock and the count correction value of frequency hopping is determined, and the difference value between the current count value corresponding to the preset clock and the count correction value of frequency hopping is taken as the receiver frequency hopping starting count value.

For example, a difference value between the predicted transmitter frequency hopping count value Slave_TC_lock11_pre and the precise clock count value Master_TC_lock1 transmitted by the transmitter, i.e., the transmitter frequency hopping starting count value, is the count correction value of frequency hopping, i.e., a precise clock count value for compensation delta_TC, and is calculated by the following formula (2):

$$delta\_TC=Slave\_TC\_lock11\_pre-Master\_TC\_lock1 \quad (2)$$

With the obtained precise clock count value for compensation delta_TC, the current $CurTC_{uncorrected}$ value of the receiver can be corrected at a current time t4 as shown in FIG. 3, and the correction is performed by the following formula (3):

$$CurTC_{corrected}=CurTC_{uncorrected}-delta\_TC \quad (3)$$

wherein $CurTC_{corrected}$ is the receiver frequency hopping starting count value, $CurTC_{uncorrected}$ is the current count value corresponding to the preset clock, and delta_TC is the count correction value of frequency hopping; and after correction, the frequency hopping of the receiver is kept to be precisely synchronized with the frequency hopping of the transmitter, the precision of frequency hopping synchronization can reach up to the precision of the precise clock counter, and the precise frequency hopping synchronization can be performed immediately upon signal detection without coarse frequency hopping synchronization, so that the time for frequency hopping synchronization is greatly shortened.

Optionally, the method further comprises the following step that: the steps S101 to S104 are repeated, to maintain frequency hopping synchronization.

It should be noted that, after the frequency hopping of the receiver is synchronized with the frequency hopping of the transmitter, the receiver performs fast scanning to follow the frequency hopping, and further corrects the local precise clock count value of the receiver during the fast scanning to follow the frequency hopping using a same correction method as the above steps S101-S104 which, as have been described in detail in the foregoing embodiments, will not be repeatedly described. The local precise clock count value of the receiver is further corrected by repeating the steps S101-S104, and the frequency hopping of the receiver can be kept to be always precisely synchronized with the frequency hopping of the transmitter; and if signal interruption or serious interference occurs during communication and causes frequency hopping to be out of synchronization, the frequency hopping can be quickly re-synchronized by repeating the steps S101-S104, and the communication can be recovered.

Figure 5:
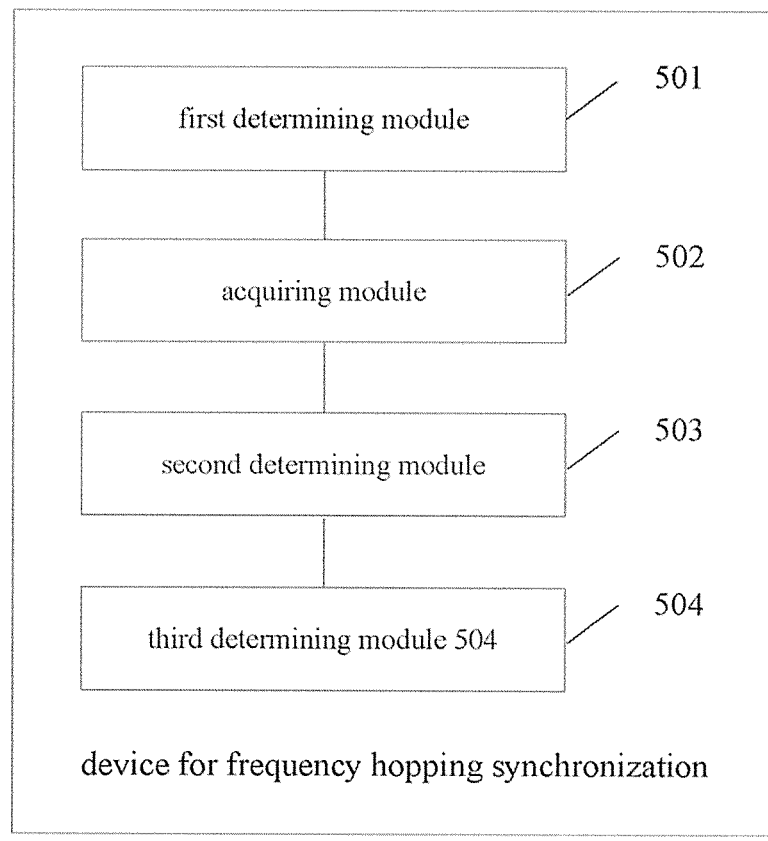
FIG. 5 is a framework schematic diagram of a device for frequency hopping synchronization according to the second embodiment of the present disclosure.

FIG. 5 is a framework schematic diagram of a device for frequency hopping synchronization according to the second embodiment of the present disclosure.

A first determining module 501, when a synchronous frame, which is sent by a transmitter and comprises a transmitter frequency hopping starting count value corresponding to a preset clock, is received, determines a first count value, corresponding to the preset clock, of the received synchronous frame; an acquiring module 502 acquires the transmitter frequency hopping starting count value, corresponding to the preset clock, in the synchronous frame and the number of relevant transmission bytes of the synchronous frame; a second determining module 503, based on the received first count value and the received number of relevant transmission bytes of the synchronous frame, determines a predicted transmitter frequency hopping count value corresponding to the preset clock; and a third determining module 504, based on the predicted transmitter frequency hopping count value and the transmitter frequency hopping starting count value, determines a receiver frequency hopping starting count value.

The optional implementation of each module is further described below:

the first determining module 501, when the synchronous frame, which is sent by the transmitter and comprises the transmitter frequency hopping starting count value corresponding to the preset clock, is received, determines the first count value, corresponding to the preset clock, of the received synchronous frame.

In this embodiment, the synchronous frame, as shown in FIG. 2, is composed of a preamble, a synchronization word and a synchronization information payload, the synchronization information payload carries precise timing information of the transmitter or master, i.e., the transmitter frequency hopping starting count value corresponding to the preset clock, which is a precise clock count value determined by a precise clock counter, and guard intervals with a preset length are added to the frame head and the frame end of the synchronous frame, wherein the guard interval added to the frame head is a hop head guard interval which is filled with the preamble; and the guard interval added to the frame end is a hop end guard interval which is used for reserving a certain period of time and does not transmit data.

Optionally, in the frequency hopping system, when the frequency hopping of the receiver or slave is not synchronized with the frequency hopping of the transmitter or master, the receiver or slave performs slow scanning to receive data by using each hopping frequency in a plurality of preset hopping frequencies in turn, and as shown in FIG. 3, the frequency value of the receiver at a time just after t1 matches the frequency value of the transmitter, so that the receiver can start to receive data sent by the transmitter, and when the first determining module 501 of the receiver receives the synchronous frame data sent by the transmitter for the first time, i.e., at a time t2, a current precise clock count value of the receiver, i.e., the first count value Slave_TC_lock2 corresponding to the preset clock, is latched.

It should be noted that, in this embodiment, a synchronous frame for frequency hopping synchronization is defined in the frequency hopping system, and the transmitter sends the synchronous frame by using an interval of frequency hopping of 4 ms, a precise clock counter with a frequency of 1 M and a precision of 1 us, and an over-the-air baud rate of 115200 Bd, wherein the transmitter performs fast scanning to send the synchronous frame by using 4 preset hopping frequencies with an interval of frequency hopping of 4 ms, and the receiver not in synchronization performs slow scanning to receive the synchronous frame by using the same 4 hopping frequencies as the transmitter with an interval of frequency hopping of 20 ms; and the guard intervals with the preset length added to the frame head and the frame end of the synchronous frame are used for reserving a certain time interval between two adjacent hopping frequencies to eliminate errors caused by frequency switching, processing delay, propagation delay and crystal oscillator deviation.

The acquiring module 502 acquires the transmitter frequency hopping starting count value, corresponding to the preset clock, in the synchronous frame and the number of relevant transmission bytes of the synchronous frame.

In this embodiment, the number of relevant transmission bytes comprises: the number of transmission bytes of the synchronization information payload in the synchronous frame, the preset number of transmission bytes of the preamble in the synchronous frame and the preset number of transmission bytes of the synchronization word in the synchronous frame.

Optionally, the transmitter latches a current precise clock count value of the transmitter at a previous time before signal sending, i.e., the transmitter hopping starting count value Master_TC_lock1 corresponding to the preset clock, which is determined by the precise clock counter, that is, at a starting time of frequency hopping of the transmitter, the transmitter stores the precise clock count value in the synchronization information payload in the synchronous frame and transmits the synchronous frame; when the receiver receives the synchronous frame sent by the transmitter for the first time during slow scanning, a current precise clock count value Slave_TC_lock2 of the receiver is latched, as shown in FIG. 3, when the time moves to a time t3, the acquiring module 502 of the receiver parses the synchronization information payload in the received synchronous frame to extract the precise clock count value Master_TC_lock1 sent by the transmitter, and the number of bytes of the synchronization information payload parsed at the current time is latched as Nbyte3; meanwhile, the number of bytes of the preamble in the synchronous frame sent by the transmitter is a preset constant Nbyte1, and the number of bytes of the synchronization word in the synchronous frame sent by the transmitter is a preset constant Nbyte2.

It should be noted that, the precise clock counter is set to zero at the time of the end of each frequency hopping, and the count value of the precise clock counter can be modified; and the preset constant Nbyte1 and the preset constant Nbyte2 are given data and may be obtained from a preset storage area of the receiver directly.

The second determining module 503, based on the received first count value and the received number of relevant transmission bytes of the synchronous frame, determines the predicted transmitter frequency hopping count value corresponding to the preset clock.

Optionally, the second determining module 503 comprises: a second count value determination unit which determines a second count value, corresponding to the preset clock, corresponding to the number of relevant transmission bytes of the synchronous frame; and a predicted transmitter frequency hopping count value determination unit which determines a difference value between the received first count value and the second count value, and takes the difference value as the predicted transmitter frequency hopping count value.

For example, the second determination module 503 of the receiver calculates the predicted transmitter frequency hopping count value Slave_TC_lock11_pre by the following formula (1):

$$\text{Slave\_TC\_lock11\_pre} = \text{Slave\_TC\_lock2} - (\text{Nbyte1} + \text{Nbyte2} + \text{Nbyte3}) * \text{Cnt\_per\_Byte} \quad (1)$$

wherein Slave_TC_lock2 is the first count value, Nbyte1 is the preset number of bytes of the preamble, Nbyte2 is the preset number of bytes of the synchronization word, and Nbyte3 is the number of bytes of the synchronization information payload received at the time of the first count value; Cnt_per_Byte is a count value, of the precise clock counter corresponding to each byte in Nbyte1, Nbyte2 and Nbyte31; and Nbyte1 and Nbyte2 are preset constants which have been given and can be obtained from a preset storage area of the receiver directly.

The third determining module 504, based on the predicted transmitter frequency hopping count value and the transmitter frequency hopping starting count value, determines the receiver frequency hopping starting count value.

Figure 6:
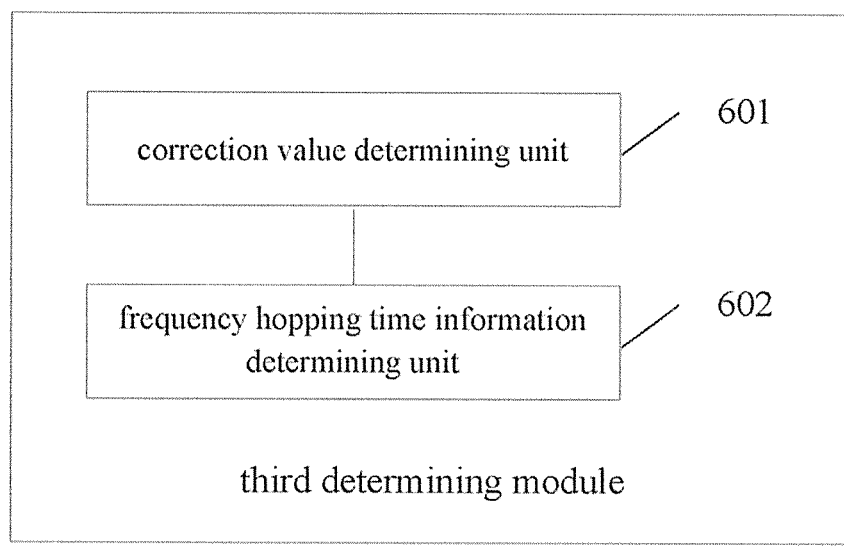
FIG. 6 is a framework schematic diagram of a third determining module according to the second embodiment of the present disclosure.

Optionally, the third determining module 504, as shown in FIG. 6, comprises: a correction value determining unit 601 which determines a difference value between the predicted transmitter frequency hopping count value and the transmitter frequency hopping starting count value, and takes the difference value between the predicted transmitter frequency hopping count value and the transmitter frequency hopping starting count value as a count correction value of frequency hopping; and a frequency hopping time information determining unit 602 which determines a difference value between a current count value corresponding to the preset clock and the count correction value of frequency hopping, and takes the difference value between the current count value corresponding to the preset clock and the count correction value of frequency hopping as the receiver frequency hopping starting count value.

For example, the correction value determining unit 601, based on a difference value between the predicted transmitter frequency hopping count value Slave_TC_lock11_pre and the precise clock count value Master_TC_lock1 transmitted by the transmitter, i.e., the transmitter frequency hopping starting count value, determines the count correction value of frequency hopping, i.e., a precise clock count value for compensation delta_TC, and calculates the precise clock count value for compensation delta_TC by the following formula (2):

$$delta\_TC = Slave\_TC\_lock11pre - Master\_TC\_lock1 \qquad (2)$$

With the obtained precise clock count value for compensation delta_TC, the frequency hopping time information determining unit 602 corrects the current $CurTC_{uncorrected}$ value of the receiver at a current time t4 as shown in FIG. 3, and performs correction by the following formula (3):

$$CurTC_{corrected} = CurTC_{uncorrected} - delta\_TC \qquad (3)$$

wherein $CurTC_{corrected}$ is the receiver frequency hopping starting count value, $CurTC_{uncorrected}$ is the current count value corresponding to the preset clock, and delta_TC is the count correction value of frequency hopping; and after correction, the frequency hopping of the receiver is kept to be precisely synchronized with the frequency hopping of the transmitter, the precision of frequency hopping synchronization can reach up to the precision of the precise clock counter, and the precise frequency hopping synchronization can be performed immediately upon signal detection without coarse frequency hopping synchronization, so that the time for frequency hopping synchronization is greatly shortened.

Optionally, the device further comprises: a repeating module which repeats the steps that when a synchronous frame comprises a transmitter frequency hopping starting count value corresponding to a preset clock, is received, a first count value, corresponding to the preset clock, of the received synchronous frame is determined; the transmitter frequency hopping starting count value, corresponding to the preset clock, in the synchronous frame and the number of relevant transmission bytes of the synchronous frame are acquired; based on the received first count value and the received number of relevant transmission bytes of the synchronous frame, a predicted transmitter frequency hopping count value corresponding to the preset clock is determined; and based on the predicted transmitter frequency hopping count value and the transmitter frequency hopping starting count value, a receiver frequency hopping starting count value is determined; to maintain frequency hopping synchronization.

It should be noted that, after the frequency hopping of the receiver is synchronized with the frequency hopping of the transmitter, the receiver performs fast scanning to follow the frequency hopping, and further corrects the local precise clock count value of the receiver during the fast scanning to follow the frequency hopping by the repeat module which adopts a same correction process as the above steps S101-S104 which, as have been described in detail in the foregoing embodiments, will not be repeatedly described; the local precise clock count value of the receiver is further corrected by repeating the steps S101-S104, and the frequency hopping of the receiver is kept to be always precisely synchronized with the frequency hopping of the transmitter; and if signal interruption or serious interference occurs during communication and causes the frequency hopping to be out of synchronization, the frequency hopping can be quickly re-synchronized by the repeat module, and the communication can be recovered.

The third embodiment of the present disclosure provides a receiver comprising the device for frequency hopping synchronization of any one of the technical solutions described above.

The fourth embodiment of the present disclosure provides a method for frequency hopping synchronization, comprising the following steps that: a count value corresponding to a preset clock is latched; the latched count value corresponding to the preset clock is added into a preset synchronous frame; and the synchronous frame is sent at a next preset time of the count value.

It should be noted that the executive subject of this embodiment is a transmitter or master.

The optional implementation of each step is further described below:

the count value corresponding to the preset clock is latched.

Optionally, the transmitter latches a current precise clock count value of the transmitter at a previous time before signal sending, i.e., the transmitter hopping starting count value Master_TC_lock1 corresponding to the preset clock, which is determined by the precise clock counter, that is, at a starting time of frequency hopping of the transmitter.

The latched count value corresponding to the preset clock is added into the preset synchronous frame.

Optionally, the transmitter stores the precise clock count value in the synchronization information payload in the synchronous frame.

The synchronous frame is sent at the next preset time of the count value.

Optionally, the transmitter sends the synchronous frame at the next preset time of the count value.

The fifth embodiment of the present disclosure provides a device for frequency hopping synchronization, comprising: a latching module which latches a count value corresponding to a preset clock; an adding module which adds the latched count value corresponding to the preset clock into a preset synchronous frame; and a sending module which sends the synchronous frame at a next preset time of the count value.

The optional implementation of each module is further described below:

the latching module, which latches the count value corresponding to the preset clock.

Optionally, the latching module latches a current precise clock count value of the transmitter at a previous time before signal sending, i.e., the transmitter hopping starting count value Master_TC_lock1 corresponding to the preset clock, which is determined by the precise clock counter, that is, at a starting time of frequency hopping of the transmitter.

The adding module, which adds the latched count value corresponding to the preset clock into the preset synchronous frame.

Optionally, the adding module stores the precise clock count value in the synchronization information payload in the synchronous frame.

The sending module, which sends the synchronous frame at the next preset time of the count value.

Optionally, the sending module sends the synchronous frame at the next preset time of the count value.

The sixth embodiment of the invention provides a transmitter, comprises a device for frequency hopping synchronization; and the device comprises: a latching module, which latches a count value corresponding to a preset clock; an adding module, which adds the latched count value corresponding to the preset clock into a preset synchronous frame; and a sending module, which sends the synchronous frame at a next preset time of the count value. Optional implementations in this embodiment have been described in detail in the foregoing embodiments, and will not be described in detail herein.

Figure 7:
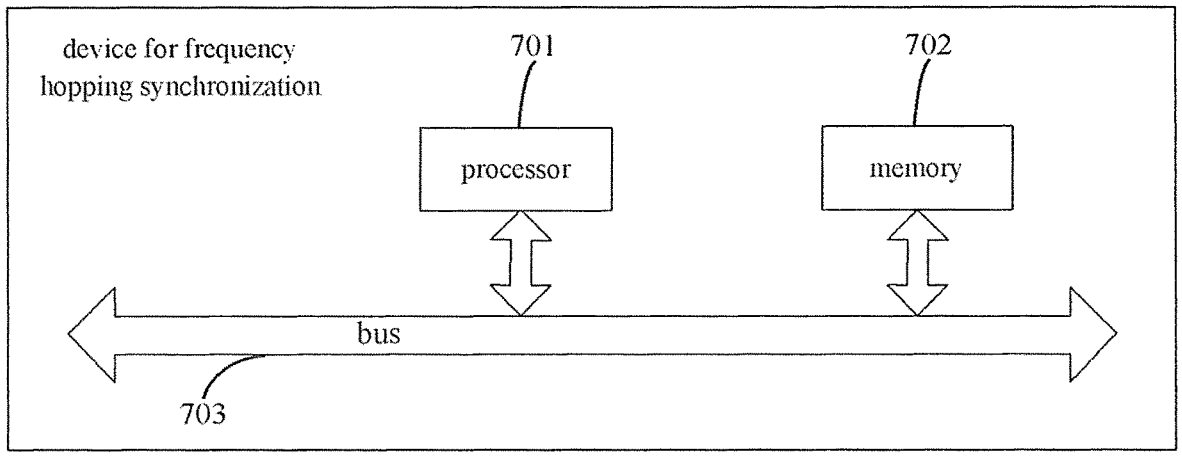
FIG. 7 is a framework schematic diagram of a device for frequency hopping synchronization according to a seventh embodiment of the present disclosure.

FIG. 7 is a framework schematic diagram of a device for frequency hopping synchronization according to the seventh embodiment of the present disclosure.

Referring to FIG. 7, the device comprises: at least one processor 701; and at least one memory 702 in communication connection with the processor 701, wherein:

the memory 702 stores program instructions executable by the processor 701, and the processor 701, by calling the program instructions, is capable of performing the method provided by the first embodiment as shown in FIG. 1 and relevant embodiments thereof, for example, comprising the following steps that:

when a synchronous frame, which is sent by a transmitter and comprises a transmitter frequency hopping starting count value corresponding to a preset clock, is received, a first count value, corresponding to the preset clock, of the received synchronous frame is determined;

the transmitter frequency hopping starting count value, corresponding to the preset clock, in the synchronous frame and the number of relevant transmission bytes of the synchronous frame are acquired;

based on the received first count value and the received number of relevant transmission bytes of the synchronous frame, a predicted transmitter frequency hopping count value corresponding to the preset clock is determined; and based on the predicted transmitter frequency hopping count value and the transmitter frequency hopping starting count value, a receiver frequency hopping starting count value is determined.

Referring to FIG. 7, in this embodiment, the processor 701 and the memory 702 communicates with each other through a bus 703.

The eighth embodiment of the present disclosure discloses a receiver comprising the device shown in FIG. 7. Optional implementations of the device have been described in detail in the foregoing embodiments, and will not be described in detail herein.

The ninth embodiment of the present disclosure discloses a computer program product, the computer program product comprises a computer program stored on a non-transitory computer-readable storage medium, and the computer program comprises program instructions which, when executed by a computer, cause the computer to perform the method provided by the first embodiment as shown in FIG. 1 and relevant embodiments thereof, for example, comprising the steps that:

when a synchronous frame, which is sent by a transmitter and comprises a transmitter frequency hopping starting count value corresponding to a preset clock, is received, a first count value, corresponding to the preset clock, of the received synchronous frame is determined;

the transmitter frequency hopping starting count value, corresponding to the preset clock, in the synchronous frame and the number of relevant transmission bytes of the synchronous frame are acquired;

based on the received first count value and the received number of relevant transmission bytes of the synchronous frame, a predicted transmitter frequency hopping count value corresponding to the preset clock is determined; and based on the predicted transmitter frequency hopping count value and the transmitter frequency hopping starting count value, a receiver frequency hopping starting count value is determined.

The tenth embodiment of the present disclosure discloses a non-transient computer-readable storage medium, the non-transitory computer-readable storage medium stores computer instructions which cause a computer to perform the method provided by the first embodiment as shown in FIG. 1 and relevant embodiments thereof, for example, comprising the steps that:

when a synchronous frame, which is sent by a transmitter and comprises a transmitter frequency hopping starting count value corresponding to a preset clock, is received, a first count value, corresponding to the preset clock, of the received synchronous frame is determined;

the transmitter frequency hopping starting count value, corresponding to the preset clock, in the synchronous frame and the number of relevant transmission bytes of the synchronous frame are acquired;

based on the received first count value and the received number of relevant transmission bytes of the synchronous frame, a predicted transmitter frequency hopping count value corresponding to the preset clock is determined; and based on the predicted transmitter frequency hopping count value and the transmitter frequency hopping starting count value, a receiver frequency hopping starting count value is determined.

Figure 8:
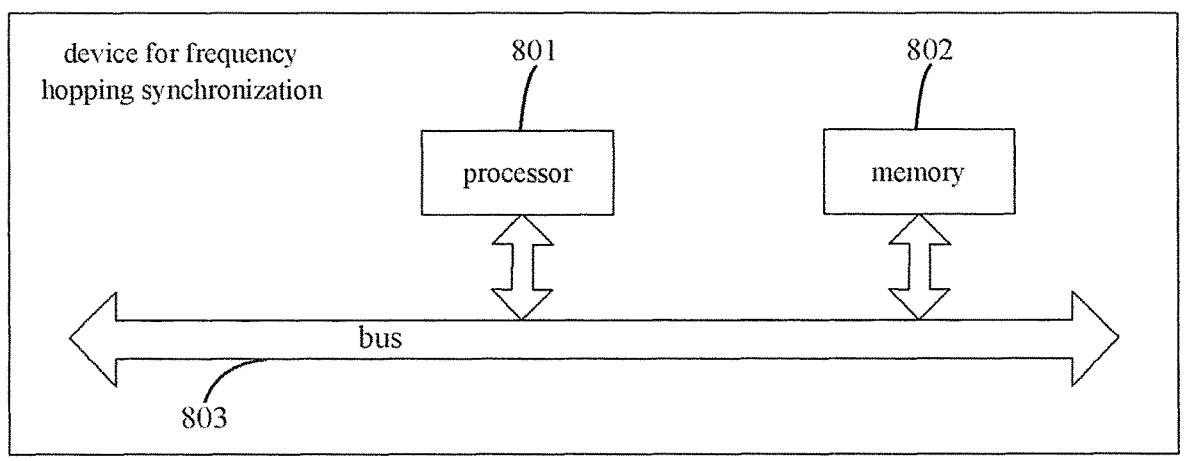
FIG. 8 is a framework schematic diagram of a device for frequency hopping synchronization according to an eleventh embodiment of the present disclosure.

FIG. 8 is a framework schematic diagram of a device for frequency hopping synchronization according to the eleventh embodiment of the present disclosure.

Referring to FIG. 8, the device comprises: at least one processor 801; and at least one memory 802 in communication connection with the processor 801, wherein:

the memory 802 stores program instructions executable by the processor 801, and processor 801, by calling the program instructions, is capable of performing the method provided by the fourth embodiment and relevant embodiments thereof, for example, comprising the steps that:

a count value corresponding to a preset clock is latched;

the latched count value corresponding to the preset clock is added into a preset synchronous frame; and the synchronous frame is sent at a next preset time of the count value.

Referring to FIG. 8, in this embodiment, the processor 801 and the memory 802 communicates with each other through a bus 803.

The twelfth embodiment of the present disclosure discloses a transmitter, comprises the device shown in FIG. 8. Optional implementations of the device have been described in detail in the foregoing embodiments, and will not be described in detail herein.

The thirteenth embodiment of the present disclosure discloses a computer program product, the computer program product comprises a computer program stored on a non-transitory computer-readable storage medium, and the computer program comprises program instructions which, when executed by a computer, cause the computer to perform the method provided by the fourth embodiment and relevant embodiments thereof, for example, comprising the steps that:

a count value corresponding to a preset clock is latched;

the latched count value corresponding to the preset clock is added into a preset synchronous frame; and the synchronous frame is sent at a next preset time of the count value.

The fourteenth embodiment of the present disclosure discloses a non-transitory computer-readable storage medium, the non-transitory computer-readable storage medium stores computer instructions which cause a computer to perform the method provided by the fourth embodiment and relevant embodiments thereof, for example, comprising the steps that:

a count value corresponding to a preset clock is latched;
the latched count value corresponding to the preset clock is added into a preset synchronous frame; and
the synchronous frame is sent at a next preset time of the count value.

It will be appreciated by those skilled in the art that the present disclosure includes devices for performing one or more of the operations described herein. These devices may be optionally designed and manufactured for the required purposes, or may include known devices in general-purpose computers. These devices have computer programs stored therein that are selectively activated or reconfigured. Such a computer program may be stored in a device (e.g., a computer) readable medium or any type of media suitable for storing electronic instructions and coupled to a bus, and the computer readable medium includes, but not limited to, any type of disks (including floppy disks, hard disks, optical disks, CD-ROMs, and magneto-optical disks), ROM (Read-Only Memory), RAM (Random Access Memory), EPROM (Erasable Programmable Read-Only Memory), EEPROM (Electrically Erasable Programmable Read-Only Memory), flash memory, magnetic cards or optical cards. That is, a readable medium includes any medium for storing or transmitting information in a form readable by a device (e.g., a computer).

It will be appreciated by those skilled in the art that, each block in the structural diagrams and/or block diagrams and/or flowcharts, and combinations of the blocks in the structural diagrams and/or block diagrams and/or flowcharts, can be implemented with computer program instructions. It will be appreciated by those skilled in the art that, these computer program instructions may be provided to a processor of a general purpose computer, a special purpose computer, or other programmable data processing methods to perform the functions specified in a block or multiple blocks of the structural diagrams and/or block diagrams and/or flowcharts disclosed in the present disclosure by the processor of the computer or other programmable data processing method.

It will be appreciated by those skilled in the art that, steps, measures and solutions in various operations, methods and processes discussed in the present disclosure may be alternated, modified, combined, or deleted. Further, other steps, measures and solutions in various operations, methods and processes discussed herein may also be alternated, modified, reordered, decomposed, combined, or deleted. Further, the steps, measures and solutions in various operations, methods and processes discussed herein in the prior art may also be alternated, modified, reordered, decomposed, combined, or deleted.

While the foregoing is directed to only a few embodiments of the present disclosure, it should be appreciated by those skilled in the art that various changes and modifications may be made without departing from the spirit and scope of the invention.

INDUSTRIAL APPLICABILITY

According to the technical solutions of the present disclosure, when a synchronous frame, which is sent by a transmitter and comprises a transmitter frequency hopping starting count value corresponding to a preset clock, is received, a first count value, corresponding to the preset clock, of the received synchronous frame is determined; the transmitter frequency hopping starting count value, corresponding to the preset clock, in the synchronous frame and the number of relevant transmission bytes of the synchronous frame are acquired; based on the received first count value and the received number of relevant transmission bytes of the synchronous frame, a predicted transmitter frequency hopping count value corresponding to the preset clock is determined; and based on the predicted transmitter frequency hopping count value and the transmitter frequency hopping starting count value, a receiver frequency hopping starting count value is determined; therefore, the frequency hopping of a receiver can be synchronized with the frequency hopping of the transmitter according to the receiver frequency hopping starting count value, and the precision of frequency hopping synchronization is greatly improved as the frequency hopping synchronization is implemented by controlling the receiver frequency hopping starting count value; besides, the time for frequency hopping synchronization can be shortened and the probability of success of frequency hopping synchronization can also be increased while the precision of frequency hopping synchronization is greatly improved, so that the stability of the frequency hopping system is enhanced, providing high industrial applicability.

What is claimed is:

1. A method for frequency hopping synchronization, comprising the following steps:
   when a synchronous frame, which is sent by a transmitter and comprises a transmitter frequency hopping starting count value corresponding to a preset clock, is received, determining a first count value, corresponding to the preset clock, of the received synchronous frame;
   acquiring the transmitter frequency hopping starting count value, corresponding to the preset clock, in the synchronous frame and a number of relevant transmission bytes of the synchronous frame;
   based on the received first count value and the received number of relevant transmission bytes of the synchronous frame, determining a predicted transmitter frequency hopping count value corresponding to the preset clock; and
   based on the predicted transmitter frequency hopping count value and the transmitter frequency hopping starting count value, determining a receiver frequency hopping starting count value.

2. The method of claim 1, wherein the number of relevant transmission bytes comprises: the number of transmission bytes of a synchronization information payload in the synchronous frame, the preset number of transmission bytes of a preamble in the synchronous frame and the preset number of transmission bytes of a synchronization word in the synchronous frame.

3. The method of claim 1, wherein the step of based on the received first count value and the received number of relevant transmission bytes of the synchronous frame, determining the predicted transmitter frequency hopping count value corresponding to the preset clock, comprises:
   determining a second count value, corresponding to the preset clock corresponding to the number of relevant transmission bytes of the synchronous frame; and
   determining a difference value between the received first count value and the second count value, and taking the difference value as the predicted transmitter frequency hopping count value.

4. The method of claim 1, wherein the step of based on the predicted transmitter frequency hopping count value and the transmitter frequency hopping starting count value, determining the receiver frequency hopping starting count value, comprises:

determining a difference value between the predicted transmitter frequency hopping count value and the transmitter frequency hopping starting count value, and taking the difference value between the predicted transmitter frequency hopping count value and the transmitter frequency hopping starting count value as a count correction value of frequency hopping; and determining a difference value between a current count value corresponding to the preset clock and the count correction value of frequency hopping, and taking the difference value between the current count value corresponding to the preset clock and the count correction value of frequency hopping as the receiver frequency hopping starting count value.

5. The method of claim 4, wherein the receiver frequency hopping starting count value is determined by the following formulas:

$$CurTC_{corrected} = CurTC_{uncorrected} - \text{delta\_TC}$$

wherein $CurTC_{corrected}$ is the receiver frequency hopping starting count value, $CurTC_{uncorrected}$ is the current count value corresponding to the preset clock, and delta_TC is the count correction value of frequency hopping;

$$\text{delta\_TC} = \text{Slave\_TC\_lock11\_pre} - \text{Master\_TC\_lock1}$$

wherein Slave_TC_lock11_pre is the predicted transmitter frequency hopping count value; and Master_TC_lock1 is the transmitter frequency hopping starting count value; and $$\text{Slave\_TC\_lock11\_pre} = \text{Slave\_TC\_lock2} - (Nbyte1 + Nbyte2 + Nbyte3) * \text{Cnt\_per\_Byte}$$

wherein Slave_TC_lock2 is the first count value, Nbyte1 is the preset number of bytes of the preamble, Nbyte2 is the preset number of bytes of the synchronization word, and Nbyte3 is the number of bytes of the synchronization information payload received at the time of the first count value; and Cnt_per_Byte is a count value, corresponding to the preset clock corresponding to each byte in Nbyte1, Nbyte2 and Nbyte3.

6. A receiver, comprising a device for frequency hopping synchronization, wherein the device comprises:

at least one processor; and at least one memory connected with the processor, wherein, the memory stores program instructions executable by the processor, and the processor, by calling the program instructions, is capable of performing:

when a synchronous frame, which is sent by a transmitter and comprises a transmitter frequency hopping starting count value corresponding to a preset clock, is received, determining a first count value, corresponding to the preset clock, of the received synchronous frame;

acquiring the transmitter frequency hopping starting count value, corresponding to the preset clock, in the synchronous frame and a number of relevant transmission bytes of the synchronous frame;

based on the received first count value and the received number of relevant transmission bytes of the synchronous frame, determining a predicted transmitter frequency hopping count value corresponding to the preset clock; and based on the predicted transmitter frequency hopping count value and the transmitter frequency hopping starting count value, determining a receiver frequency hopping starting count value.

7. A non-transitory computer program product, wherein the computer program product comprises a computer program stored on a non-transitory computer-readable storage medium, and the computer program comprises program instructions which, when executed by a computer, cause the computer to perform:

when a synchronous frame, which is sent by a transmitter and comprises a transmitter frequency hopping starting count value corresponding to a preset clock, is received, determining a first count value, corresponding to the preset clock, of the received synchronous frame;

acquiring the transmitter frequency hopping starting count value, corresponding to the preset clock, in the synchronous frame and a number of relevant transmission bytes of the synchronous frame;

based on the received first count value and the received number of relevant transmission bytes of the synchronous frame, determining a predicted transmitter frequency hopping count value corresponding to the preset clock; and based on the predicted transmitter frequency hopping count value and the transmitter frequency hopping starting count value, determining a receiver frequency hopping starting count value.

\* \* \* \* \*